United States Patent
Kimura

[11] Patent Number: 5,875,629
[45] Date of Patent: Mar. 2, 1999

[54] RETURN VALVE FOR A HYDRAULIC SYSTEM

[75] Inventor: Kiyoshi Kimura, Fujisawa, Japan

[73] Assignee: Kabushiki Kaisha Ogura, Kanagawa-ken, Japan

[21] Appl. No.: 917,424

[22] Filed: Aug. 26, 1997

[30] Foreign Application Priority Data

Aug. 26, 1996 [JP] Japan .................................. 8-223891

[51] Int. Cl.$^6$ .............................. B26F 1/14; F16D 31/02
[52] U.S. Cl. ................................ 60/329; 91/356; 60/477; 83/639.1
[58] Field of Search .......................... 83/639.1; 137/535, 137/539, 115.26, 566, 567, 569; 91/356; 60/329, 477

[56] References Cited

U.S. PATENT DOCUMENTS

| 1,922,379 | 8/1933 | Longfellow | 137/539 |
| 3,469,481 | 9/1969 | Cloup | 83/639.1 |
| 4,072,167 | 2/1978 | Habiger | 137/535 |
| 4,176,682 | 12/1979 | Diehl | 137/539 |
| 4,953,582 | 9/1990 | Kennedy | 137/569 |
| 5,564,468 | 10/1996 | Mueller | 137/539 |

FOREIGN PATENT DOCUMENTS

0554507 A1  11/1993  European Pat. Off. ............... 83/639.1
1528991     12/1989  U.S.S.R. ............................... 137/535

Primary Examiner—Rinaldi I. Rada
Assistant Examiner—Stephen Choi
Attorney, Agent, or Firm—Dickstein Shapiro Morin & Oshinsky LLP

[57] ABSTRACT

A portable one-hand-operable, hydraulic punching machine is disclosed which comprises at least two pumps driven by an electric motor, and a single-acting, spring-return cylinder driven by one of the pumps for a variety of punching operations such as cutting, perforating, and wrenching. The machine has a pump housing and a cylinder housing disposed end to end, with a partition therebetween in which there are formed a fluid supply passageway for supplying a hydraulic fluid under pressure from one pump to the cylinder fluid chamber, a fluid return passageway for returning the fluid from the cylinder fluid chamber to the pump fluid chamber, and a spool chamber open to the return passageway. In order to hold the return passageway closed during cylinder extension, and to open the same for cylinder contraction a return valve is provided which includes a spool reciprocably received in the spool chamber. Normally holding the return passageway open under spring pressure, the valve spool closes the return passageway upon delivery of the fluid under pressure into the spool chamber by the other pump in the pump fluid chamber. A relief valve is provided for bleeding off excess pressure from the spool chamber into the cylinder fluid chamber.

4 Claims, 2 Drawing Sheets

RETURN VALVE FOR A HYDRAULIC SYSTEM

BACKGROUND OF THE INVENTION

This invention relates generally to fluid-actuated machines for performing a variety of punching operations such as bending, cutting, perforating, and wrenching, and more particularly to portable, one-hand-operable, hydraulic punching machines comprising a hydraulic cylinder driven by one or more pumps for any desired punching operation. Still more particularly, the present invention pertains to improvements in or relating to a return valve which is held closed during the extension of the hydraulic cylinder and which opens to permit the hydraulic fluid to return from the cylinder fluid chamber to the pump fluid chamber during cylinder contraction.

The portable, hydraulic punching machine of the general character set forth above is described and claimed in Japanese Patent Publication No. 6-75738. The return valve normally holds the fluid return passageway open under spring pressure and closes the same in response to fluid pressure from a pump that is driven concurrently with the other pump or pumps for powering the cylinder. The punching machine is operable merely by a finger actuation of a trigger switch for on-off control of an electric motor for driving the pumps.

Typically, the return valve has a spring-loaded spool reciprocably received in a spool chamber which is open to the fluid return passageway and which also communicates with one of the pumps thereby to be actuated against the bias of the spring. A clearance is provided around the spool in order to permit excess fluid to escape from the spool chamber back into the pump fluid chamber.

Difficulties have been encountered in determining the clearance of the return valve spool because the viscosity of oil or like hydraulic fluid is subject to change with its temperature: the higher the temperature, the lower the viscosity. Conventionally, the clearance was made as small as 0.1 millimeter or so at a maximum in order to assure proper oil leakage from the spool chamber when the oil rose in temperature, and so dropped in viscosity, after a prolonged period of use of the machine; otherwise, the heated oil would have leaked so fast that the spool would have failed to close the return passageway in opposition to the force of the spring.

The noted setting of the spool clearance is unsatisfactory, however, when the oil temperature is very low, as immediately after the machine is set into operation, especially in cold weather. The oil viscosity is then so high that, conventionally, leakage through the small spool clearance tended to drop to less than the required rate. Excess pressure often built up in the spool chamber, overloading the drive motor even when the machine itself was not in use and, in the worst case, ruining the piston seals of the pump. The machines of this type were in need of frequent repairs for these reasons, and their useful life was severely limited.

Making the spool clearance greater would provide no remedy at all. It would serve only to cause excessive oil leakage at lower oil temperatures than heretofore. It is apparent that this problem cannot be overcome merely through adjustment of the spool clearance, inasmuch as hydraulic machine oils as we have them today are unavoidably susceptible to wide change in viscosity with temperatures.

SUMMARY OF THE INVENTION

It is therefore among the objects of this invention to assure proper leakage of the hydraulic fluid from the spool chamber, and at the same time to prevent excessive fluid pressure rise therein, in hydraulic punching machines of the kind defined, in the face of varying viscosities of the fluid.

Another object of the invention is to provide a relief valve that fulfills the first recited object and which is so simple and compact in construction that it can be easily built into the hydraulic punching machines with a minimum of space requirement.

Stated in brief, the present invention generally concerns a hydraulic punching machine wherein a partition between a pump fluid chamber and a cylinder fluid chamber has formed therein a first fluid supply passageway for supplying a fluid under pressure from the pump fluid chamber to the cylinder fluid chamber by first pump means, a fluid return passageway for returning the fluid from the cylinder fluid chamber to the pump fluid chamber, a spool chamber open to the fluid return passageway, and a second fluid supply passageway for supplying the fluid under pressure from the pump fluid chamber to the spool chamber by second pump means, and wherein a spool is reciprocably mounted with clearance in the spool chamber for normally holding the fluid return passageway open under the bias of a spring and for closing the fluid return passageway against the bias of the spring upon delivery of the fluid under pressure to the spool chamber through the second fluid supply passageway by the second pump means. Characteristically, according to the invention, a relief passageway is formed in the partition for communicating the spool chamber with the cylinder fluid chamber, and a relief valve is provided for normally holding the relief passageway closed and for opening the same upon development of fluid pressure in excess of a predefined limit in the spool chamber.

The spool clearance may be left the same as heretofore so that the fluid may properly leak from the spool chamber even when its viscosity dropped because of a temperature rise. When the fluid viscosity is very high, on the other hand, with a consequent rise in spool chamber fluid pressure in excess of a prescribed limit, the relief valve will open to bleed off the excess pressure. With the spool chamber fluid pressure thus kept at no more than the limit, the electric drive motor for the pumps is not to be overloaded, nor are the pump piston seals to be ruined.

Preferably, the relief valve comprises a valve member movable into and out of fluid-tight engagement with the relief passageway in the partition, and a spring for normally holding the valve member in fluid tight engagement with the relief passageway. This construction is preferred because a simple adjustment of the spring force is all that is required to determine the limit to which fluid pressure is allowed to build up in the spool chamber.

Still more preferably, the valve member of the relief valve takes the form of a ball, and the spring a cantilever spring. Under the force of the cantilever spring the ball may be normally held seated against an annular valve seat around the relief passageway and unseated therefrom against the spring force upon development of excessive fluid pressure in the spool chamber. The combination of ball and cantilever spring is believed to be simplest and most compact in construction, demanding a minimal installation space.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
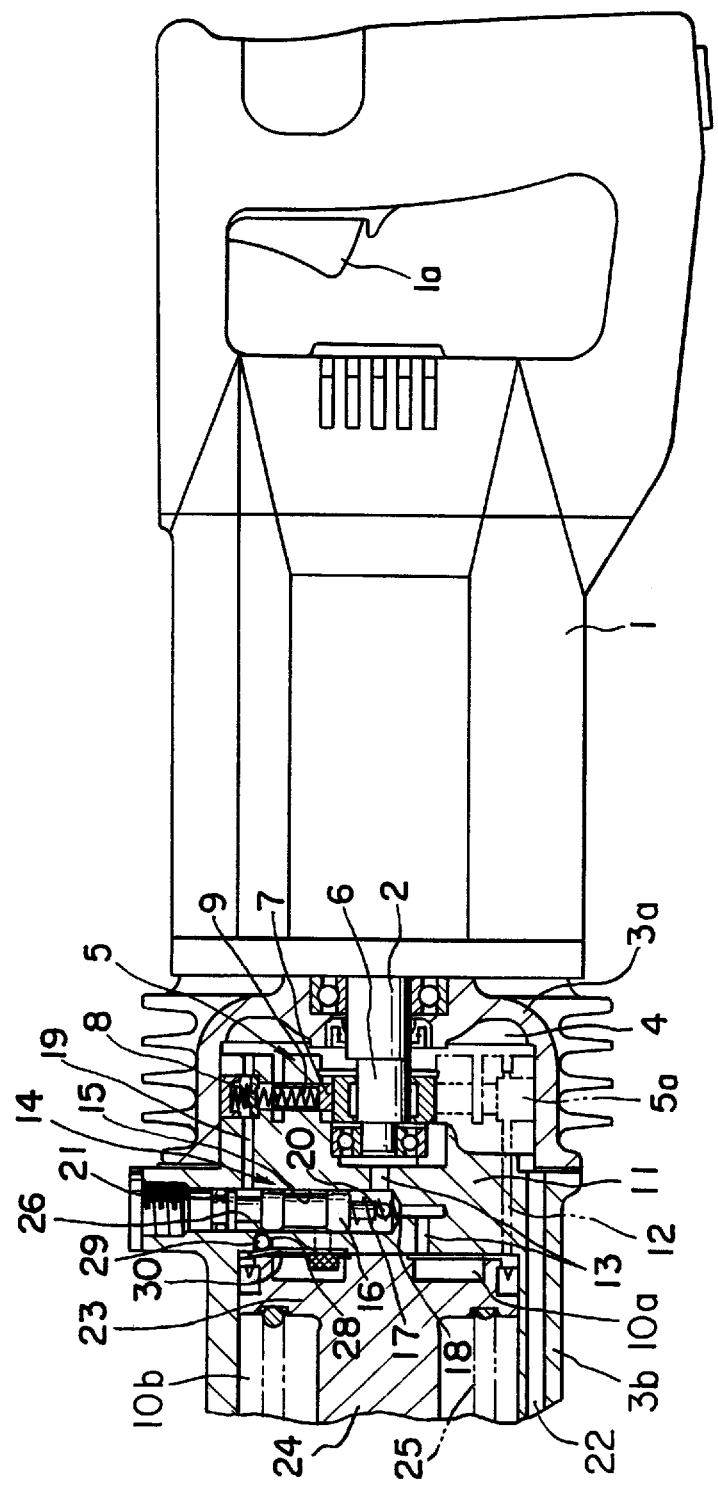
FIG. 1 is a fragmentary axial section, partly shown in elevation for illustrative convenience, through the portable, one-hand-operable, hydraulic punching machine constructed in accordance with the novel concepts of this invention.

Although the showing of FIG. 1 is fragmentary, it will nevertheless be seen that the representative punching machine according to the invention has an electric motor 1, complete with a trigger switch 1a, for driving hydraulic pumps to be set forth presently. Coupled endwise to a pump housing 3a, the drive motor 1 has its armature shaft 2 projecting into a pump fluid chamber 4 which is defined by the pump housing and which is to be filled with a hydraulic fluid such as oil. This pump housing is in turn coupled end to end to a cylinder housing 3b, with a partition 11 therebetween.

Figure 2:
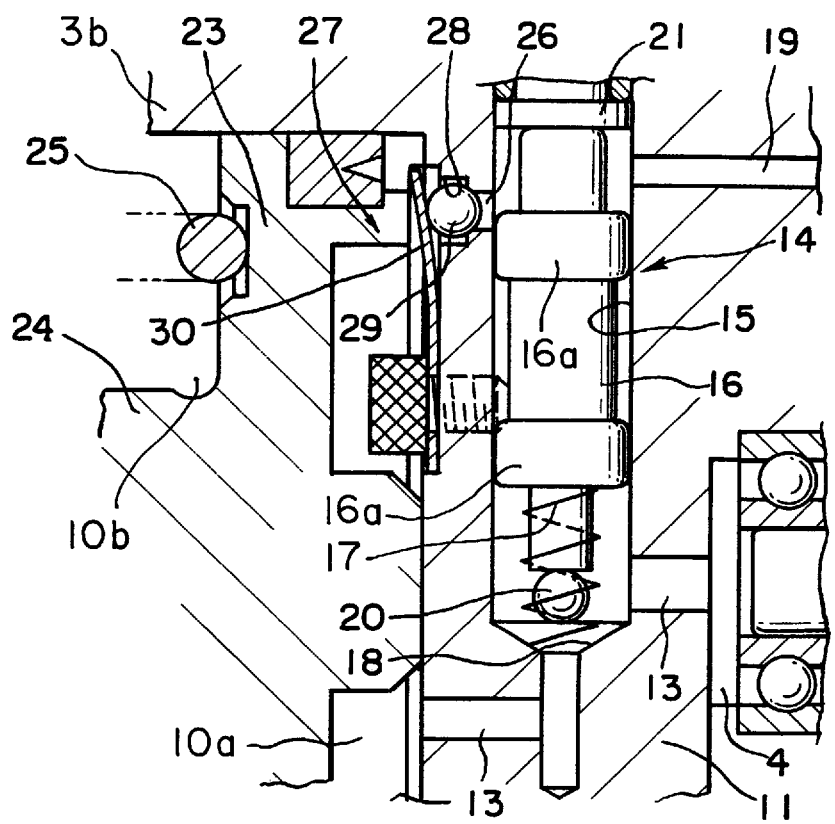
FIG. 2 is an enlarged, fragmentary section, taken along the same plane as FIG. 1, showing in particular the return valve of the hydraulic cylinder incorporated with the punching machine, and the relief valve for the return valve.

As shown also in FIG. 2, a piston 23 is slidably but pressure-tightly mounted within the cylinder housing 3b, with a piston rod 24 extending therefrom in a direction away from the motor 1 and carrying a desired punching tool, not shown, on its end. The piston 23 divides the interior of the cylinder housing 3b into a cylinder fluid chamber 10a opposite the partition 11, and a spring chamber 10b accommodating a return spring shown as a helical compression spring 25. A single-acting, spring-return hydraulic cylinder is thus formed.

With reference back to FIG. 1, projecting as aforesaid into the pump fluid chamber 4, the motor armature shaft 2 terminates in an eccentric camshaft 6. It is understood that a plurality of, three in this particular embodiment, pumps are conventionally provided within the pump housing 3a, all driven by the camshaft 6. One of the pumps, indicated by the solid lines in FIG. 1 and generally designated 5, is for actuating a return valve 14. The other two pumps, one depicted in phantom outline and labeled 5a, are for driving the hydraulic cylinder piston 23. Since all the pumps are identical in construction, only the pump 5 will be described in detail, with the understanding that the same description applies to each of the other two pumps 5a.

The representative pump 5 has a piston 7 driven by the camshaft 6 via a needle bearing for reciprocation in the pump fluid chamber 4, and a check valve 8, complete with a biasing spring 9, which permits fluid flow away from the pump fluid chamber under pressure by the reciprocating piston.

The fluid pressurized by the other two pumps 5a is directed through fluid supply passageways 12 into the cylinder fluid chamber 10a In response to the fluid pressure thus supplied, the cylinder piston 23 together with the piston rod 24 is to be thrust forwardly, or to the left as viewed in FIGS. 1 and 2, on its power stroke against the force of the return spring 25 for a desired punching operation. The cylinder housing 3b has a fluid passageway 22, FIG. 1, to permit the fluid to flow from cylinder spring chamber 10b to pump fluid chamber 4 during this piston power stroke.

During the subsequent return stroke of the cylinder piston 23 under the force of the return spring 25, the fluid must be returned from cylinder fluid chamber 10a to pump fluid chamber 4. Provided to this end is a fluid return passageway 13 in the partition 11, which passageway is closed by a return valve 14 during the power stroke of the cylinder piston 23 and opened during its return stroke. The pump 5, FIG. 1, serves the purpose of supplying the pressurized fluid to the return valve 14 by way of a fluid supply passageway 19 in the partition in order to cause the return valve to close the return passageway 13 during the piston power stroke.

As better pictured on an enlarged scale in FIG. 2, the return valve 14 includes a spool 16, complete with lands 16a, which is reciprocably received in a spool chamber 15 of cylindrical shape with a maximum clearance of 0.1 millimeter, as has been the case heretofore. Formed in the partition 11, the spool chamber 15 is open endwise to the fluid return passageway 13, so that the spool 16 is slidable into and out of engagement with a valve seat 18 formed in the middle of the return passageway. The spool 16 is shown to terminate in a ball 20 for fluid tight contact with the valve seat 18, the latter being shown to be in the shape of a truncated cone.

Normally, or when the pumps 5 and 5a are out of operation, the spool 16 is biased by a helical compression spring 17, which is sleeved upon part of the spool, out of engagement with the valve seat 18 and in contact with an abutment 21 terminating the spool chamber 15. The return passageway 13 is then open, communicating the cylinder fluid chamber 10a with the pump fluid chamber 4. Upon delivery of the pressurized fluid from the pump 5 via the supply passageway 19, the spool 16 will travel into engagement with the valve seat 18 against the bias of the spring 17 thereby closing the return passageway 13. So closed, the return passageway 13 is divided into a cylinder half, open to the cylinder fluid chamber 10a, and a pump half open to the pump fluid chamber 4. The cylinder half is out of communication with the spool chamber 15, but the pump half is still in communication therewith.

As has been mentioned, the spool 16 is received with clearance in the spool chamber 15. Consequently, any fluid that has been pumped into the spool chamber 15 beyond what is needed to close the return valve 14 is free to escape through this clearance back into the pump fluid chamber 4 through the pump half of the return passageway 13. Additionally, however, a relief valve is provided as at 27 in FIG. 2 in accordance with the present invention for bleeding off any excess fluid pressure that may develop in the spool chamber as when the fluid is too high in viscosity to flow through the spool clearance at the required rate.

Figure 3:
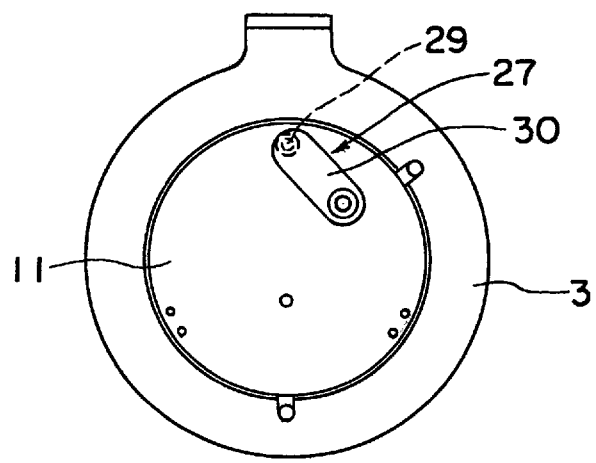
FIG. 3 is a left hand side elevation of the relief valve and neighboring parts, the view being shown on the same scale as that of FIG. 1.

As shown also in FIG. 3, the return valve 27 comprises a valve member in the form of a ball 29, and resilient means in the form of a leaf spring 30. Cantilevered to the partition 11, the leaf spring 30 is self-biased against the ball 29, normally holding the same in fluid-tight engagement with an annular valve seat 28 around a relief passageway 26 which communicates the spool chamber 15 with the cylinder fluid chamber 10a The leaf spring 30 will yield upon development of fluid pressure in the spool chamber 15 in excess of a prescribed limit, permitting the ball 29 to open the relief passageway 26. This limit of fluid pressure is therefore determinable by the force exerted by the leaf spring 30 on the ball 29.

In operation, the piston 23 of the hydraulic cylinder will be held in abutment against the partition 11 under the force of the return spring 25, and the spool 16 of the return valve 14 against the abutment 21 under the force of the return spring 17, both as indicated in FIGS. 1 and 2, when the electric motor 1 is out of rotation. The trigger switch 1a may be finger actuated for turning on the motor 1. With the consequent rotation of the motor armature shaft 2 together with the camshaft 6, the pistons 7 of the pumps 5 and 5a will reciprocate and so pressurize the fluid in the pump fluid chamber 4. The pressurized fluid will be delivered by the pump 5 to the spool chamber 15 of the return valve 14 through the supply passageway 19, and by the other pumps 5a to the cylinder fluid chamber 10a through the supply passageways 12.

Flowing into the spool chamber 15, the pressurized fluid will act on the lands 16a of the spool 16, causing the same to travel into fluid tight contact with the valve seat 18 against the force of the return spring 17. With the return passageway 13 thus closed by the spool 16, the cylinder fluid chamber 10a is discommunicated from the pump fluid chamber 4. The fluid subsequently pumped into the spool chamber 15 will flow through the spool clearance back into the pump fluid chamber 4 through the pump half of the return passageway 13, provided, however, that the fluid is sufficiently low in viscosity.

On flowing into the cylinder fluid chamber 10a, on the other hand, the fluid under pressure from the pumps 5a will push the piston 23 forwardly against the bias of the return spring 25, the return passageway 13 having been closed almost instantly upon operation of the pump 5. As the piston 23 thus travels on its power stroke with the piston rod 24, the unshown tool on the end of the piston rod will perform a desired punching operation.

Both pumps 5 and 5a will cease operation when the trigger switch 1a of the motor 1 is released upon completion of the punching operation. Thereupon the return valve spool 16 will travel back to the FIG. 2 position under the influence of the return spring 17, unseating the ball 20 from the valve seat 18 and thereby reopening the return passageway 13. The fluid will therefore flow from cylinder fluid chamber 10a back to pump fluid chamber 4 as the piston 23 retracts to the FIG. 2 position under the force of the return spring 25. One cycle of punching operation has now been completed.

When the machine is used in cold weather, and immediately after the start of use, the hydraulic fluid may be so low in temperature, and therefore so high in viscosity, that the fluid may flow through the spool clearance at less than the required rate following the closure of the return passageway 13. The fluid pressure in the spool chamber 15 will then rise until it exceeds the limit predetermined by the force of the cantilever spring 30 of the relief valve 27, whereupon the ball 29 will be dislodged from the valve seat 28 by the excess pressure and so open the relief passageway 26. The excess fluid will then escape from spool chamber 15 to cylinder fluid chamber 10a. All the noted inconveniences heretofore encountered in the art because of the variable viscosity of the fluid can thus be overcome.

Despite the forgoing detailed disclosure, it is not desired that the invention be limited by the exact showing of the drawings or the description thereof. For example, a unitized check valve could be employed as the relief valve 27, although the illustrated construction of the relief valve is preferred by virtue of its compactness and the ease with which the limit of fluid pressure in the spool chamber 15 is adjustable. All these and other modifications or alterations within the usual knowledge of the specialists are intended in the foregoing disclosure, so that the invention should be construed broadly and in a manner consistent with the fair meaning or proper scope of the following claims.

What is claimed is:

1. A hydraulic system comprising:

(a) a pump housing defining a pump fluid chamber to be filled with a hydraulic fluid;

(b) a cylinder housing;

(c) a piston slidably mounted within the cylinder housing and defining a cylinder fluid chamber in combination therewith;

(d) a partition between the pump fluid chamber and the cylinder fluid chamber, the partition having formed therein a first fluid supply passageway for supplying the fluid under pressure from the pump fluid chamber to the cylinder fluid chamber, a fluid return passageway for returning the fluid from the cylinder fluid chamber to the pump fluid chamber, a spool chamber open to the fluid return passageway, a second fluid supply passageway for supplying the fluid under pressure from the pump fluid chamber to the spool chamber, and a relief passageway communicating the spool chamber with the cylinder fluid chamber;

(e) first pump means in the pump fluid chamber for pressurizing the fluid for delivery to the cylinder fluid chamber through the first fluid supply passageway in the partition;

(f) second pump means in the pump fluid chamber for pressurizing the fluid for delivery to the spool chamber in the partition through the second fluid supply passageway;

(g) a spool mounted within said cylinder housing;

(h) first resilient means for biasing said spool in a predetermined direction within said cylinder housing;

(i) said spool being reciprocably mounted in the spool chamber with clearance, said spool holding the fluid return passageway open under the bias of the first resilient means and closing the fluid return passageway against the bias of the first resilient means upon delivery of the fluid under pressure from the pump fluid chamber to the spool chamber by the second pump means; and (j) relief valve means for holding the relief passageway closed and for opening the relief passageway upon development of fluid pressure in excess of a predefined limit in the spool chamber.

2. The hydraulic system of claim 1 wherein the relief valve means comprises:

(a) a valve member movable into and out of sealing engagement with the relief passageway in the partition; and (b) second resilient means for holding the valve member in sealing engagement with the relief passageway.

3. The hydraulic system of claim 2 wherein the valve member of the relief valve means is a ball to be seated against, and unseated from, an annular valve seat around the relief passageway.

4. The hydraulic system of claim 2 wherein the second resilient means of the relief valve is a leaf spring cantilevered to the partition.

* * * * *